United States Patent Office 3,510,552
Patented May 5, 1970

3,510,552
BIAXIALLY DRAWING POLYAMIDE FILM
Motohiro Tsuruta and Mutsuo Kuga, Kyoto-shi, Takeshi Mashimo, Uji-shi, and Wakuo Matsumura, Hirakata-shi, Japan, assignors to Nippon Rayon Company Limited (Nippon Rayon Kabushiki Kaisha), Uji-shi, Kyoto-fu, Japan, a body corporate of Japan
No Drawing. Continuation-in-part of application Ser. No. 536,481, Jan. 24, 1966. This application Sept. 12, 1966, Ser. No. 578,449
Claims priority, application Japan, Sept. 16, 1965, 40/56,493
Int. Cl. B69d 7/24
U.S. Cl. 264—289                                   15 Claims

ABSTRACT OF THE DISCLOSURE

Polyamide film is processed by adding 2 to 12% by weight water, preheating and then biaxially drawing at a temperature lower than the preheating temperature and in the range 100 to 180° C. The process results in film having improved gauge properties. Controlled drawing conditions, e.g. draw speed, leads to further improved products.

---

This application is a continuation-in-part of Ser. No. 536,481, filed Jan. 24, 1966, and now abandoned.

This invention relates to a process for improving polyamide films. More particularly, this invention relates to a process for further improving simultaneously and biaxially drawn polyamide films to provide polyamide films of very even thickness and other improved properties.

Films of thermoplastic resins such as polyesters, polypropylene, polyvinyl chloride, polyvinylidene chloride, polystyrene, polycarbonate etc., have previously been prepared by biaxial drawing techniques. However, polyamide films have not been produced on a commercial scale by biaxial drawing techniques owing to the various difficult properties faced when treating polyamides, which possess strong hydrogen bonds and tend to "neck-out."

Additionally, in a conventional two-step process for drawing polyamide films, a certain quantity of a monomer is utilized as plasticizer to improve the behavior of polyamides in drawing. However, pure polyamide films are preferable to plasticize films. Moreover biaxially oriented films have superior properties to those prepared by other known drawing processes.

In parent application Ser. No. 536,481 a new and useful process for producing improved polyamide films by simultaneous and biaxial drawing technique was taught. In this process for drawing a substantially amorphous polyamide film, the film is drawn simultaneously and biaxially in the longitudinal and transverse directions at a temperature within the range of from 70° C. to 180° C. but which is at least 35° C. below the melting point of the film. The ratio of the longitudinal and transverse draw speeds is maintained from about 2:1 to about 0.5:1, and the draw ratio controlled to be 16:1 to 4:1. The draw speed is preferably kept at 6,000 to 100,000 percent per minute.

The films obtained according to the foregoing process are advantageously utilized, for example, in industrial, packaging, textile, and commercial uses. The films have improved properties such as transparency, mechanical properties such as tensile strength, soft feel, brightness, air and vapor permeability, oil resistance and electrical properties, as well as high dimensional stability.

However, very even thickness and homogeneous physical properties of polyamide films are particularly required when these films are utilized for certain applications, such as for bags, tapes, stripes, bands, metalized films and the like or when polyamide films are continuously treated with winder, slitter, folding machines, etc. The foregoing process did not consistently satisfy these needs, nor sufficiently restrain bowing effects.

It has now surprisingly been discovered that polyamide films having very even thickness and homogeneous physical properties can be produced by adding a relatively large amount of water to the substantially amorphous polyamide film, pre-heating said polyamide film at a temperature which is higher than the drawing temperature, and then drawing said pre-heated film in an analogous manner to that described previously above and in greater detail in parent application Ser. No. 536,481, which is hereby incorporated by reference.

According to the present invention, more than about 2% of water based on weight of film is added to the film and the film heated at a temperature which is not higher than 200° C. and which is 10–50° C. above the draw temperature. Thereafter the film is drawn simultaneously in the longitudinal and transverse directions at a temperature within the range of from 100° C. to 180° C. which is at least 35° C. below the melting point of the film, the ratio of draw speeds being from about 2:1 to about 0.5:1, and the draw ratio being from 16:1 to 4:1. The resultant film can be optionally heat treated, etc., as described in Ser. No. 536,481.

The amount of water incorporated in the film normally varies from 2 to 12%, especially 2 to 10%, and generally should be less than about 10%.

Maximum amounts of water, which can be added to polyamide films, vary according to the types of polyamide films and can be exemplified as follows (approximate values):

|  | Percent |
|---|---|
| Poly-ε-caproamide | 10–12 |
| Polyhexamethylene-adipamide | 10 |
| Polyhexamethylene-sebacamide | 5 |
| Poly-11-amino-undecanamide | 3 |

However, these values may largely vary according to the temperature and other conditions, under which the films is treated.

It is preferred, for example, to add a water about 2–10% (by its weight) to poly-ε-caproamide and poly-hexamethylene-adipamide, about 2–5% to poly-hexamethylene-sebacamide and about 2–3% to poly-11-amino-undecanamide.

An excessive water content (for example more than about 10% for poly-ε-caproamide or poly-hexamethylene-adipamide films) can give rise to the disadvantages of breakages of the film in drawing or inferior film properties.

On the other hand, a water content less than about 2% can cause to various troubles such as lack of evenness, necking-out, etc.

Water can be added to any extruded polyamide film, which is normally in absolutely-dried state immediately after the extrusion, by various means, such as, for example, water bath, water spray, etc. It is also possible to add water after the sheet formation. Moreover, it is possible to use water containing a suitable coloring matter or anti-static agent and the like.

After the addition of water the film is preheated at a temperature about 10–50° C. higher than that of the drawing zone. The residence period within the preheating zone is adjusted to raise the temperature of the film to this value.

Polyamide films useful in the process of the present invention can in general be prepared by the following processes:

(1) Extrusion of molten polymer (e.g. T-die process, inflation process, etc.).

(2) Processes using solvents (e.g. dry process, wet processes, etc.).

The following terms employed in the instant specification are defined as indicated.

DEFINITIONS (1) The term "polyamide" includes all substantially linear-type polyamides, such as, poly-ε-caproamide, poly-hexamethylene-adipamide, poly - hexamethylene - sebacamide, poly-11-amino-undecanamide, copolymerized polyamide, etc.

(2) "Substantially amorphous polyamide film" is defined as a film having a crystallinity of not more than 30% as measured before drawing. Polyamides having a crystallinity of more than 30% are subject to various disadvantages, such as breakage in drawing.

(3) "Crystallinity" can be defined as follows:

$$\text{Crystallinity} = \frac{(d_a - d)}{(d_a - d_c)} \times \frac{(d_c)}{(d)} \times 100 \text{ percent}$$

in which $d$ is the density of the film; $d_c$ is the density of the crystalline structure; and $d_a$ is the density of the non-crystalline structure in the film.

The following table gives examples of linear polyamides having a crystallinity of not more that about 30% measured at 25° C.

TABLE I

| | $d_c$ | $d_a$ | $d$ |
|---|---|---|---|
| Poly-hexamethylene-adepamide | 1.24 | 1.09 | <1.131 |
| Poly-ε-caproamide | 1.212 | 1.113 | 1.141 |
| Poly-11-amino-undecanamide | 1.12 | 1.01 | 1.040 |
| Poly-hexamethylene-sebacamide | 1.157 | 1.041 | 1.073 |

(4) "Draw speed" can be defined by the following formula:

$$\text{Draw speed} = d_1/d_2 \times 100 \text{ (percent/}t\text{)}$$

wherein $d_2$ is thickness of the drawn film, $d_1$ is thickness of the film before drawing, and $t$ is the time in minutes necessary to draw the film.

(5) "Ratio of draw speeds" can be defined as follows:

$$\text{Ratio of draw speeds} = \frac{\text{longitudinal draw speed}}{\text{transverse draw speed}}$$

in which the longitudinal draw speed and transverse draw speed show respectively normal values or mean values of draw speeds in longitudinal and transverse directions from the beginning of drawing to an optional point reached in the drawing process. Draw speeds are measured at the said point.

In other words, when a film having a length of $L_1$ and width of $H_1$ is drawn, the longitudinal draw speed and transverse draw speed can be defined respectively as follows:

$$l_t/L_1 \times 100\%/t$$

and $$h_t/H_1 \times 100\%/t$$

wherein $l_t$ and $h_t$ are respectively the length in the transverse direction and width of the drawn film, which are measured after $t$ minutes from the beginning of the drawing at an optional point on the film track.

(6) In industrial practice of biaxial and simultaneous drawing, it is preferred to define the "draw ratio" as $d_1/d_2$, in which $d_2$ is the thickness of a drawn film and $d_1$ is the thickness of said film before drawing.

(7) "Percent gauge variation" (hereinafter designated as percent GV) shows the evenness of a polyamide film and can be defined as follows:

$$\text{Percent } GV = \frac{t_2 - t_1}{t_0} \times 100\%$$

where $t_1$, $t_2$ and $t_0$ are respectively the minimum, maximum and average thickness of a polyamide film and can be measured on a line from one end to another end of the polyamide film in the transverse direction.

The smaller the percent GV, the generally better evenness of the film. Polyamide films produced by conventional extruding processes generally have a large percent GV when drawn by conventional drawing techniques.

(8) "Gauge magnification" (hereinafter defined as GM) shows the relationship between percent GV's before and after the drawing, namely $$GM = V_s/V_i$$

where $V_s$ and $V_i$ stand for the respective percent GV's after and before drawing.

A GM value of 1 shows that the drawing operation has not effected the percent GV during the drawing and a GM of less than 1 shows that the percent GV has been improved during the drawing operation.

(9) Bowing defects: Thermoplastic film in drawing is liable to a lagging of its central portions behind its edges. This phenomena is called "bowing," and can give rise to disadvantages, such as unbalanced tensile properties, unbalanced dimensional stability.

Bowing degree can be illustrated by "bowing curvature" (hereinafter designated as BC), which can be defined as follows:

BC = distance of a lagging at the central portion of the drawn film/breadth of the drawn film.

No satisfactory method for restraining bowing defects of a biaxially drawn polyamide films has been previously reported due to prior difficulties with biaxial drawing methods. However, such defects can be largely avoided according to the present invention, and improved polyamide films having a percent GV of less than about 20% and a BC of less than about 0.01 can be advantageously obtained.

As indicated in parent application Serial No. 536,481, it is preferred to maintain a draw temperature from about 100° C. to a temperature which is not higher than 180° C. and which is at least 35° C. below the melting point of the film. Particularly good results can generally be achieved at about 100–180° C. By drawing at these high temperatures, polyamide films can be advantageously drawn from the very first with larger magnifications and with large draw speeds. Although some polyamide films can be drawn at a draw temperature about 180° C., various disadvantages such as heat deterioration can occur.

Melting points of several polyamides are described on page 34 of "Mechanical Properties of Polymer" by Lawrence E. Nielsen (Reinhold Publishing Corp., New York, U.S.A., 1962) as follows:

| | ° C. |
|---|---|
| Poly-ε-caproamide | 225 |
| Polyhexamethylene adipamide | 265 |
| Poly-11-amino-undecanamide | 194 |
| Polyhexamethylene sebacamide | 227 |

The draw speed of the polyamide film is preferably about 6,000–100,000%/min., and especially good results can be obtained at a draw speed ranging from about 10,000–60,000%/min.

A draw speed of less than about 6,000%/min. can give rise to necking-out and even breakages. A draw speed more than 100,000%/min. can also give rise to breakages or necking-out.

At any point on the surface of the polyamide film during drawing ratio of draw speeds should be from about 2:1 to 0.5:1 for best results. It is possible to draw a film at various ratios of draw speeds, but this ratio must be maintained within a range from 0.5 to 2.0 when the ratio of the thickness of a drawn film to that of the material drawing is to be less than 0.25.

According to the present invention, it is preferred to attain draw ratios from about 16:1 to 4:1. A ratio higher than about 16:1 can give rise to nonuniformity or partial breakages of the obtained films, while a ratio less than about 4:1 can also give rise to various troubles. In addition, such a low ratio does not yield films having particularly useful properties, and is not therefore useful for drawing polyamides on a commercial scale.

While the present invention basically relates to the control of water in the film and pre-heating prior to the foregoing drawing operation, additional further processing steps including heat-setting, heat-shrinking and further heat-setting can optionally be employed to improve properties. In particular, good dimensional stability can be thus obtained.

By way of example, a drawn film processed according to the present invention can be heated for about 1 second to 1 minute at about 120° C. to a temperature not higher than 10° C. below the melting point of the film to improve the film properties. The period of time for the heat-setting depends upon the thickness of the drawn film, temperature of heat-setting and desired properties of the film, etc. Such a drawn film has improved properties, although it is difficult to remove distortions from the resulting film by the above mentioned heat-setting process, in particular where improved dimensional stability is required.

A shrinking step for the removal of distortion of the drawn film may also be used. It comprises shrinking a drawn film simultaneously and biaxially at a ratio of shrinking speeds of about 0.5–2.0, to an extent of about 1–10%, and from about 120° C. to a about 10° C. below the melting point of the film.

The ratio of shrinking can be defined as follows:

$$\text{Ratio of shrinking} = \frac{d_4 - d_3}{d_3} \times 100\%$$

in which $d_3$ and $d_4$ are the thicknesses of polyamide film before and after shrinking, respectively. Ratio of shrinking speeds=ratio of shrinking speed in the longitudinal direction to that in the transverse direction (shrinking speeds being taken as means values of shrinking speeds).

The films obtained according to the present invention, however, can be utilized without any such after-treatment or finishing processes, for industrial, packaging, textile, and commercial uses. Films prepared according to the present invention have improved properties such as transparency, mechanical properties such as tensile strength, soft feel, brightness, air vapor permeability, oil resistance, electrical properties and high dimensional stability. Films prepared according to the present invention possesses even thickness and other properties.

Various features of the present invention will be made more fully apparent by reference to the following description and accompanying examples.

Examples 1–6

The following Table I shows the results obtained from various experiments, in which various amounts of water were first added to a substantially amorphous film of poly-ε-caproamide (0.1 mm. in average thickness; percent gauge variation 8), and the film then pre-heated in a pre-heating zone where the atmosphere was maintained at 180° C. In all cases the film was thereafter simultaneously and biaxially drawn in a drawing zone, where the atmosphere was maintained at 140° C., with a draw speed of about 24,000%/min. and at a ratio of draw speeds of about 1 to obtain a film having a thickness of about 0.01 mm.

TABLE 1.—EFFECTS OF WATER CONTENTS ON FILM PROPERTIES

| Example No. | Water contents, percent | Percent GV | GM | BCX525 |
|---|---|---|---|---|
| 1 | 8.3 | 7 | 0.9 | 0 |
| 2 | 6.0 | 8 | 1.0 | 1 |
| 3 | 4.5 | 9 | 1.1 | 1 |
| 4 | 2.0 | 15 | 1.9 | 3 |
| 5 | 1.2 | 22 | 2.5 | 6 |
| 6 | 0.8 | 24 | 3.0 | 15 |

As shown in Table I, water contents of more than 2% yielded improved films having very even thickness and minor BC (bowing defects).

Examples 7–15

The following Table 2 shows the results obtained from various experiments in which 4.5 weight perecnt water was first added to a substantially amorphous film of poly-ε-caproamide (0.1 mm. in average thickness; percent gauge variation 8, density 1.130). The film was then pre-heated in the pre-heating zone where the atmosphere was maintained in a range of 100–200° C., and thereafter drawn simultaneously and biaxially in a drawing zone where the atmosphere ranged between 100–180° C., with a draw speed of about 24.000%/min. and at a ratio of draw speeds of about 1 to obtain a film having a thickness of about 0.01 mm.

TABLE 2.—EFFECT OF PRE-HEAT AND DRAW TEMPERATURES ON FILM PROPERTIES

| Example No. | Temperatures Pre-heating zone | Drawing zone | Percent GV | GM | BCX525 |
|---|---|---|---|---|---|
| 7 | 200 | 160 | 9 | 1.1 | 2 |
| 8 | 180 | 160 | 12 | 1.5 | 3 |
| 9 | 180 | 140 | 9 | 1.1 | 1 |
| 10 | 160 | 140 | 13 | 1.6 | 3 |
| 11 | 160 | 120 | 12 | 1.5 | 4 |
| 12 | 120 | 100 | 14 | 1.7 | 5 |
| 13 | 180 | 180 | 21 | 2.6 | 2 |
| 14 | 160 | 160 | 23 | 2.9 | 3 |
| 15 | 140 | 140 | 25 | 3.1 | 5 |

As shown in Table 2, films processed according to the present invention have even thickness and minor BC. Use of a temperature differential gave greater film eveness (low percent GV).

Example 16

A substantially amorphous film (average thickness of 0.1 mm.; percent gauge variation 8; no beaded edges) of poly-ε-caproamide (relative viscosity 2.7 when measured at 25° C. in 96% sulfuric acid) was extruded with an extruding speed of 12 m./mmin. by means of a conventional T-die process using a 65 mm. extruder. It was immediately then dipped in a water bath, which was maintained at 45° C. and which had an effective length of 36 m., to give the film a water content of about 8.3% (measured by Karl Fischer method) and a density of 1.130. Immediately after this the film was pre-heated by passing it at a through-put speed of 12m./min. through a pre-heating zone 2 m. in length, where the atmosphere was maintained at 180° C. by conventional infra-red heaters.

The pre-heated film was then simultaneously and biaxially drawn with a draw speed of about 24,000%/min., as previously defined, for about 2.2 seconds through a drawing zone 0.9 m. in length, where the atmosphere was maintained at 140° C., the film was drawn to a magnification of about 3 in both longitudinal and transverse directions at a ratio of draw speeds of about 1.

The drawn film was passed with a through-put speed of 36 m./min. through a heat-setting zone 1 m. in length, where the atmosphere was maintained at 180° C., under tension such that the transverse dimension would be kept constant. It was then passed through a shrinking zone 4 m. in length, where the atmosphere was maintained at 200° C. by means of hot air, with a ratio of shrinking speeds of about 1 to give a shrinkage value of 6% in both the longitudinal and transverse directions. It was then heat-set by passing through a heat-setting zone 1 m. in length, where the atmosphere was maintained at 200° C. by means of hot air, with a through-put speed of about 36 m./min. under tension such that the transverse dimension would be kept constant. Thereafter it was air-cooled to a room temperature to give a biaxially drawn film having an aevrage thickness of 0.01 mm.

The atmospheric temperatures were measured at 0.5 cm. above the film tracks in the pre-heating and drawing zones.

The film obtained had an even thickness and well balanced properties (percent gauge variation 7; gauge magnification 0.9; bowing curvature 0.). Excellent surface properties were achieved when the same was metalized in vacuum with aluminum by a conventional technique.

The following table shows the properties of the resulting film according to this example.

TABLE 3

Tensile strength:
 Longitudinal—2000 kg./cm.²
 Transverse—2200 kg./cm.²
Elongation:
 Longitudinal—90%
 Transverse—100%
Shrinkage:
 (In air at 130° C.)—Not more than 1%

Shrinkage value is a ratio of shrinking per unit area, which was obtained by leaving a film for 30 minutes in hot air to give free shrinkage without any tension.

For comparison purposes, another biaxially drawn film was prepared under similar conditions to those described above with the exception that it had a water content of 1.2% before the pre-heating zone.

The comparative film had uneven thickness (percent gauge variation 22; gauge magnification 2.5; bowing curvature 6/525) and other inferior properties.

Example 17

A substantially amorphous film (average thickness 0.1 mm.; percent gauge variation 10; no beaded edges) of poly-ε-caproamide (relative viscosity 2.7 when measured at 25° C. in 96% sulfuric acid) which was extruded in a similar manner to that described in Example 16. It was dipped in water at 45° C. to give a water content of 4.5% and a density of 1.130, and was then passed with a through-put speed of 15 m./min. through a pre-heating zone 2 m. in length, where the atmosphere was maintained at 180° C. with conventional hot-air heaters. The film was thereafter drawn biaxially and simultaneously with a draw speed of about 30,000%/min. through a drawing zone 2 m. in length, where the atmosphere was maintained at 140° C. by conventional infra-red heaters to draw a film with a magnification of about 4 in both longitudinal and transverse directions at a ratio of draw speeds of about 1.0–1.3.

The drawn film was passed with a through-put speed of 60 m./min. thorugh a heat-setting zone 10 m. in length, where the atmosphere was maintained at 180° C. by hot air, under tension such that the transverse dimension would be kept constant and was then air-cooled to a room temperature to give a biaxially drawn film having an average thickness of 0.006 mm., percent gauge variation 14 and bowing curvature 2/525. The film had an even thickness as well as other improved film properties.

Example 18

A substantially amorphous film (average thickness 0.1 mm.; gauge variation 8; no beaded edges) of poly-11-amino undecanamide (relative viscosity 2.7 when measured at 25° C. in 96% sulfuric acid) was made with a conventional T-die process. It was dipped in water at 50° C. to give the film a water content of about 2.1% and a density of 1.030. The film was immediately passed with a through-put speed of 20 m./min. through a pre-heating zone 2 m. in length, where the atmosphere was maintained at 160° C. The preheated film was then biaxially and simultaneously drawn with a draw speed of about 17,000%/min. through a drawing zone 2.5 m. in length, where the atmosphere was maintained at 140° C., to draw a film with a magnification of about 3.3 in both longitudinal and transverse directions at a ratio of draw speeds of about 0.8–1.2.

The drawn film was passed with a through-put speed of 66 m./min. through a heat-setting zone 2 m. in length, where the atmosphere was maintained at 145° C., under tension such that the transverse dimension would be kept constant and was then cooled by blowing cool air to a room temperature.

The biaxially drawn film obtained had an average thickness of 0.01 mm., percent gauge variation of 9; and bowing curvature of 1/525. This film had well balanced properties and an even thickness so that it could be well wound up on a wind-up apparatus and could be treated very easily.

Example 19

A substanially amorphous poly-ε-caproamide film (density of 1.130; percent gauge variation 8; average thickness of film of 0.1 mm.) was dipped in water to give water content 4.5%. It was immediately passed with a through-put speed of 15 m./min. through a pre-heating zone 1.5 m. in length, where the atmosphere was maintained at 200° C. It was then drawn with a draw speed of about 27,000%/min. for about 2 seconds through a drawing zone 1.0 m. in length, where the atmosphere was maintained at 160° C., to draw a film with a magnification of about 3 in both longitudinal and transverse directions at a ratio of draw speeds of about 1.

The drawn film was passed with a through-put speed of 45 m./min. through a heat-setting zone, where the atmosphere was maintained at 200° C. with hot air, under tension such that the transverse dimension would be kept constant and was air-cooled.

The film obtained had an average thickness of about 0.01 mm., percent gauge variation of 9; and bowing curvature 2/525. These values show that the film obtained has improved eveness as well as other better properties.

Example 20

A biaxially drawn film was obtained in a similar manner to that described in Example 19 with the exception that the atmosphereic temperatures in the pre-heating and drawing zones were respectively maintained at 160° C. and 140° C. to obtain a drawn film having a percent gauge variation of 13 and bowing curvature of 5/525. This example shows that any possible expansion of uneven thickness due to the bowing trouble can be sufficiently controlled by the process according to the present invention.

Example 21

A substantially amorphous film (average thickness 0.2 mm.; percent gauge variation 8; water content 8.6%; density of 1.132; no beaded edges) of poly-ε-caproamide (relative viscosity 2.7 when measured at 25° C. in 96% sulfuric acid), was prepared by a conventional T-die process, water being added in a similar manner to that described in Example 16. The film was passed with a through-put speed of 12 m./min. through a pre-heating zone 2 m. in length, where the atmosphere was maintained at 180° C. by conventional infra-red heaters. It was then simultaneously and biaxially drawn with a draw speed of about 24,000%/min. for about 2.2 seconds through a drawing zone 0.9 m. in length, where the atmosphere was maintained at 160° C. by conventional infra-red heaters, to draw a film with a magnification of 3 in both longitudinal and transverse directions at a ratio of draw speeds of about 1.

The drawn film was passed with a through-put speed of 36 m./min. through a heat-setting zone 6 m. in length, where the atmosphere was maintained at 200° C., under tension such that the transverse dimension would be kept constant and was air-cooled.

A biaxially drawn film having an average thickness of 0.022 mm., percent gauge variation of 7; and bowing curvature of 0 was thus produced. These values show that this film has well balanced properties and very even thickness. It is apparent that the expansion of unevenness due to the drawing can be prevented by the present invention.

Example 22

A substantially amorphous film of poly-ε-caproamide similar to that described in Example 21 was treated in an analgous manner to that described in Example 21 with the exception of having a water content of 2.1% to obtain a film having an average thickness of 0.022 mm.; percent gauge variation of 11; and bowing curvature of 5.525. The film obtained illustrated that the expansion of the uneven thickness could be remarkable controlled by the present invention.

Various modifications will suggest themselves to those skilled in the art, and are included within the spirit of the instant invention. Having described the invention, that which is sought to be protected is set forth in the instant claims.

What is claimed is:

1. A process for drawing a synthetic linear polyamide film selected from the group consisting of poly-ε-caproamide, poly-hexamethylene-adipamide, poly-hexamethylene-sebacamide, poly-11-amino-undecanamide, copolymers of said amides, and mixtures thereof, comprising, adding 2 to 12 weight percent water to the film, preheating the film at a temperature higher than that of the draw temperature, and drawing the films simultaneously in the longitudinal and transverse directions at a temperature within the range of from 100° C. to 180° C. which is at least 35° C. below the melting point of the film, the ratio of the longitudinal and transverse draw speeds being from about 2:1 to about 0.5:1, and the draw ratio being from 16:1 to 4:1.

2. A process according to claim 1 wherein said polyamide film is a synthetic linear polyamide film having a crystallinity of less than 30%.

3. A process according to claim 1 wherein when said film comprises a member of the group consisting of poly-ε-caproamide and poly-hexamethylene-adipamide, water is added to said film in an amount of 2–10 weight percent.

4. A process according to claim 1 wherein when said film is poly-hexamethylene-sebacamide, water is added to said film in an amount of 2–5 weight percent.

5. A process according to claim 1 wherein when said film is poly-11-amino-undecanamide, water is added to said film in an amount of 2–3 weight percent.

6. A process according to claim 1 comprising preheating said film to a temperature about 10–50° C. higher than the draw temperature, but below about 200° C.

7. A process for drawing a synthetic linear polyamide film selected from the group consisting of poly-ε-caproamide, poly-hexamethylene-adipamide, poly-hexamethylene-sebacamide, poly-11-amino-undecanamide, copolymers of said amides, and mixtures thereof, which comprises, adding 2 to 10 weight percent water to the film, pre-heating the film to a temperature about 10–50° C. higher than the subsequent drawing temperature but less than about 200° C., thereafter drawing the film simultaneously in the longitudinal and transverse directions at a temperature within the range of 100° to 180° C. which is at least 35° C. below the melting point of the film under conditions such that the ratio of longiutdinal and transverse draw speeds is 2:1 to about 0.5:1 and the draw ratio is 16:1 to 4:1.

8. A process according to claim 7 comprising drawing said film with a draw speed of from 6,000 to 100,000 percent per minute.

9. A process according to claim 7 comprising drawing said film with a draw speed of from 10,000 to 60,000 percent per minute.

10. A process according to claim 7 comprising heat-setting the drawn film at a temperature from 120° C. to not higher than 10° C. below the melting point of the film while said film is maintained under tension such that the transverse dimension is kept substantially constant.

11. A process according to claim 7 comprising shrinking the drawn film simultaneously in both the longitudinal and transverse directions at a temperature from 120° C. up to 10° C. below the melting point of the film by an amount in each case of from 1 to 10%; the ratio of shrinking speeds in the longitudinal and transverse directions being from 0.5 to 2.0.

12. A process according to claim 11 comprising heat-setting the shrunken film at a temperature of from 120° C. to a temperature not higher than 10° C. below the melting point of the film while said film is maintained under tension to keep the transverse dimension substantially constant.

13. A process according to claim 10 comprising shrinking the heat-set film simultaneously in both the longitudinal and transverse directions at a temperature from 120° C. up to 10° C. below the melting point of the film by an amount in each case of from 1 to 10 percent, the ratio of shrinking speeds in the longitudinal and transverse directions being from 0.5 to 2.0.

14. A process according to claim 13 comprising heat-setting the shrunk film at a temperature of from 120° C. to a temperature not higher than 10° C. below the melting point of the film while maintaining said film under tension to keep the transverse dimension substantially constant.

15. The process of claim 7 comprising drawing said film with a draw speed of from 6,000 to 100,000 percent per minute.

References Cited

UNITED STATES PATENTS

| | | | |
|---|---|---|---|
| 2,157,117 | 5/1939 | Miles. | |
| 2,321,635 | 6/1943 | Taylor. | |
| 2,352,725 | 7/1944 | Markwood | 264—288 |
| 2,968,065 | 1/1961 | Gronholz | 264—289 |
| 3,354,023 | 11/1967 | Dunnington et al. | 264—175 |
| 2,556,295 | 6/1951 | Pace | 264—289 |
| 2,823,421 | 2/1958 | Scarlett | 264—289 |
| 2,836,517 | 5/1958 | Gruber | 117—138.8 |
| 2,968,067 | 1/1961 | Long | 264—289 |
| 3,161,711 | 12/1964 | Tassler | 264—289 |
| 3,256,379 | 6/1966 | Heffelfinger | 264—289 |
| 3,257,489 | 6/1966 | Heffelfinger | 264—289 |

FOREIGN PATENTS 954,204   4/1964   Great Britain.

JULIUS FROME, Primary Examiner

H. MINTZ, Assistant Examiner

U.S. Cl. X.R.

260—78S